United States Patent [19]

Maulding et al.

[11] 4,218,559
[45] Aug. 19, 1980

[54] VULCANIZATION SYSTEM FOR VULCANIZABLE THIODIETHANOL ELASTOMERS

[75] Inventors: Donald R. Maulding, Somerville; Rudolf A. Behrens, Gladstone, both of N.J.

[73] Assignee: American Cyanamid Company, Stamford, Conn.

[21] Appl. No.: 17,656

[22] Filed: Mar. 5, 1979

[51] Int. Cl.$^2$ ............................................. C08G 75/14
[52] U.S. Cl. ................................. 528/389; 528/293; 528/364; 528/374; 528/376
[58] Field of Search ............... 528/374, 376, 389, 293, 528/364

[56] References Cited

U.S. PATENT DOCUMENTS

| | | | |
|---|---|---|---|
| 3,951,927 | 4/1976 | Aloia | 528/376 |
| 3,985,708 | 10/1976 | Chang et al. | 528/205 |
| 4,000,213 | 12/1976 | Chang | 260/830 S |
| 4,028,305 | 6/1977 | Li et al. | 528/309 |

Primary Examiner—Melvyn I. Marquis
Attorney, Agent, or Firm—Frank M. Van Riet

[57] ABSTRACT

The present invention relates in general to vulcanizable elastomers of thiodiethanol and, in particular, to the provision of a novel vulcanization system for vulcanizable elastomers of thiodiethanol, comprising sulfur and certain pyrazine compounds.

7 Claims, No Drawings

VULCANIZATION SYSTEM FOR VULCANIZABLE THIODIETHANOL ELASTOMERS

BACKGROUND OF THE INVENTION

Elastomers based on the condensation of a major proportion of thiodiethanol with one or more aliphatic diols containing a vulcanizable double bond are described by Aloia, U.S. Pat. No. 3,951,927; Chang et al., U.S. Pat. No. 3,985,708; Chang, U.S. Pat. No. 4,000,213; Li et al., U.S. Pat. No. 4,028,305, all of which are incorporated herein by reference. Heretofore, application of conventional sulfur vulcanization systems, e.g., sulfur, zinc oxide, benzothiazole sulfenamides, thiuram sulfides, mercaptobenzothiazole, and the like, to the vulcanization of these vulcanizable elastomers of thiodiethanol has been less than satisfactory. Zinc oxide has heretofore been considered essential to the sulfur vulcanization of unsaturated elastomers. In the thiodiethanol-based elastomers of the present invention, conventional sulfur vulcanization systems which include zinc oxide result in a fast cure, but the resulting vulcanized elastomer exhibits extremely poor heat aging properties, as manifested by high compression set and poor continuous stress relaxation. However, when zinc oxide is omitted, the cure rate is impractically slow. All of these factors indicate a poor vulcanization system for polythiodiethanol elastomers.

In order for an elastomer to achieve commercial success, it must be vulcanizable to useful products with an efficient, practical vulcanization system. It is an object of this invention to provide such a system. It is also an object to provide useful vulcanized products from thiodiethanol-based elastomers, and to provide elastomers having significantly improved compression set properties.

DESCRIPTION OF THE INVENTION INCLUDING PREFERRED EMBODIMENTS

The present invention provides a novel vulcanization system for vulcanizable polythiodiethanol elastomers, comprising sulfur and a decahydro [2,3b] pyrazine compound, represented by the formula (I):

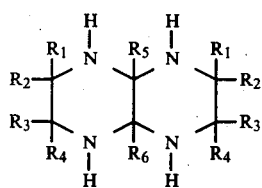

wherein $R_1$ thru $R_6$ are, individually, hydrogen or lower ($C_1$-$C_6$) alkyl; or the pair of radicals $R_2$ and $R_3$ together with the carbon atoms of the pyrazine ring, represent a saturated 6-membered alicyclic ring, the remaining substituents being as defined.

The decahydropyrazino [2, 3b] pyrazine compounds are described in Chitwood, U.S. Pat. No. 2,345,237, and are readily prepared by the condensation of glyoxal or an α,β-diketone with certain vicinal diamines, e.g., ethylenediamine; 1,2-hydrogen and/or alkyl ethylenediamines, e.g., 1-methylethylenediamine; 1,2-dibutylethylenediamine; or vicinal alicyclic diamines, e.g., 1,2-diaminocyclohexane, in accordance with the equation:

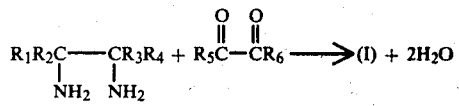

The reaction may be conducted in water or in a water miscible organic solvent, or in an organic solvent from which water may be removed by azeotropic distillation.

Representative diamines include:
Ethylenediamine
1-methylethylenediamine
1-ethylethylenediamine
1-(n-propyl)ethylenediamine
1-(isopropyl)ethylenediamine
1-(n-butyl)ethylenediamine
1-(sec.butyl)ethylenediamine
1,1-di(methyl)ethylenediamine
1,1-di(n-amyl)ethylenediamine
1,1-di(isoamyl)ethylenediamine
1,2-di(n-hexyl)ethylenediamine
1,2-di(2-methylpentyl)ethylenediamine
1,2-di(2,2-dimethylbutyl)ethylenediamine
1,1,2-trimethylethylenediamine
1,1,2-triethylethylenediamine
1,1,2-tri(n-propyl)ethylenediamine
1,1,2-tri(isopropyl)ethylenediamine
1,1,2-tri(n-butyl)ethylenediamine
1,1,2-tri(sec.butyl)ethylenediamine
1,1,2,2-tetra(ethyl)ethylenediamine
1,1,2,2-tetra(n-amyl)ethylenediamine
1,1,2,2-tetramethylethylenediamine
1,1,2,2-tetraethylethylenediamine
1,-di(2-methylpentyl)ethylenediamine
1,1-di(2,2-dimethylbutyl)ethylenediamine
1,2-diaminocyclohexane, and the like.

Glyoxal is the preferred reactant (III; $R_5$, $R_6$=H) since it is readily available. Diacetyl (2,3-butanedione) is the most readily available α,β-diketone and is also preferred. Other α,β-diketones include 2,3-pentanedione, hexanedione and the like.

The vulcanizable thiodiethanol-based elastomers useful in the present invention are preferably those disclosed in the aforementioned patents to Aloia and Chang et al. ('708).

Specifically, the vulcanizable elastomer of thiodiethanol is a polymer represented by the formula

  (II)

wherein —OG— comprises randomly alternating structural units selected from:
(A) structural units (III) and (IV)

  (III)

  (IV)

and (B) structural units (III), (IV) and (V)

  (V)

wherein R is one or more radicals remaining on removal of two hydroxyl groups from:
  (a) saturated aliphatic, linear, branched chain or cyclic diols or (b) aliphatic linear, branched chain or cyclic diols containing external unsaturation having an allylic hydrogen atom; wherein R' is one or more radicals which remain on removal of two hydroxyl groups from a diphenolic compound; said polymers comprising structural units (A) and (B) being characterized in that:
(1) n is an integer sufficient to provide in said polymer an average molecular weight of at least 8000;
(2) the molar ratio of (III) to (IV), when said polymer comprises structural unit (A), or the molar ratio of (III) to the total of (IV) and (V) when said polymer comprises structural units (B), being not less than 1:1, and
(3) they contain from about 1 to 10 mole percent of said diol (b), based on the total of all units (III), (IV) and (V) present in the polymer.

The pyrazino compound comprises from about 0.3 to 3.0 parts by weight per hundred parts by weight of elastomer, preferably 0.3 to 2.0 parts, same basis.

In addition to sulfur and the pyrazino compound the vulcanizable elastomer composition may contain other conventional rubber compounding ingredients, such as fillers and reinforcing agents, e.g., carbon black, precipitated hydrous silica, titanium dioxide, calcium silicate, calcium carbonate, and the like; calcium oxide or calcium stearate (or other fatty acid) to neutralize acid catalyst residues in the elastomer; processing aids, such as sorbitan monostearate or stearic acid; sulfur donating compounds; mercaptobenzothiazole; sulfenamides; thiuram sulfides, and the like, without departing from the scope of the invention.

The vulcanizable compositions may be prepared by conventional rubber compounding techniques, using a two-roll rubber mill, or a Banbury mixer, at temperatures of 300° F. to 400° F. The compositions are vulcanized at similar temperatures, preferably about 325°–350° F. for about 15 minutes to 60 minutes and, optionally, post-cured for periods of time to develop full cures.

The following examples are set forth by way of illustration only and are not to be construed as limitations on the present invention except as set forth in the pending claims. All parts and percentages are by weight unless otherwise specified.

EXAMPLE 1

Decahydropyrazino[2,3-b]pyrazine

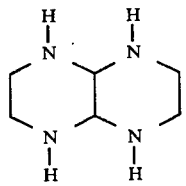

To an ice-cold solution of 206 grams of 70% aqueous ethylenediamine (144 grams, 2.4 moles) was added dropwise 115 grams of a 30% aqueous solution of glyoxal (34.8 grams, 0.6 mole). When the addition was completed, the solution was stirred at room temperature for 30 minutes, then concentrated by removing approximately 75 ml of water at 150 mm Hg. The mixture was cooled in an ice bath and the precipitated solid was filtered, stirred in 100 ml of 50% ethanol-isopropanol, and again filtered. The yield of product was 50.6 grams (59%), m.p. 222°–225° C. (dec; literature m.p. 230°–232° C.).

Calculated for $C_6H_{14}N_4$: C,50.68; H,9.86; N,39.46; Found: C,50.90; H,9.86; N, 39.80.

EXAMPLE 2

Decahydro-2,6-dimethylpyrazino[2,3-b]pyrazine

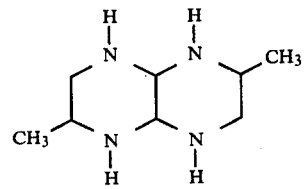

To an ice-cold solution of 148 grams, 2.0 moles, of 1-methylethylenediamine in 150 ml of water was added dropwise 145 grams of 40% aqueous glyoxal (58 grams, 1.0 mole). After the addition was completed, the solution was stirred at 5° C. for one hour, then at room temperature for 5 hours. The solution was evaporated on an open tray, and the resulting semi-solid was stirred in 500 ml of acetonitrile and filtered to give 76 grams (46% of product, m.p. 228°–235° C. (dec). Recrystallization from ethanol gave white crystals, m.p. 246-249 (dec.), literature m.p. 210° C.

Calculated for $C_8H_{18}N_4$: C,56.45; H,10.59; N,32.95; Found: C,56.31; H,10.06; N,32.92.

EXAMPLE 3

Decahydro-2,2,6,6-tetramethylpyrazino[2,3-b]pyrazine

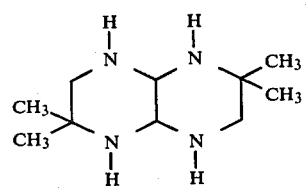

To an ice-cold solution of 52.8 grams, 0.6 mole, of 1,1-dimethylethylenediamine and 50 ml of water was added dropwise 43.5 grams of a 40% aqueous solution of glyoxal (17.4 grams, 0.3 mole), and the solution was stirred at 5° C. for 45 minutes, then at room temperature for 18 hours. The solution was poured into a tray and allowed to evaporate. The resulting slurry was stirred in 250 ml. of acetonitrile and filtered to give 35.2 grams (59%) of white crystals. Recrystallization from acetonitrile-isopropanol (1:1) gave crystals, m.p. 154°–163° C. (dec).

Calculated for $C_{10}H_{22}N_4$: C,60.60; H,11.12; N,28.28; Found: C,60.74; H,10.38; N,28.37.

EXAMPLE 4

Decahydro-2,2,3,3,6,6,7,7-octamethylpyrazino[2,3-b]pyrazine

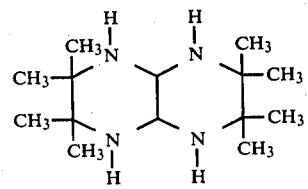

A solution of 8.6 grams (0.06 mole) of potassium carbonate and 25 ml of water was added to a cooled solution of 9.2 grams (0.05 mole) of 1,1,2,2-tetramethylethylenediamine dihydrochloride (prepared according to the method of Sayre, J. Am. Chem. Soc. 77, 6689 (1955). The resulting solution was cooled in an ice bath, stirred for 15 minutes, then treated with 3.6 grams of 40% aqueous glyoxal. Stirring was continued at 5° C. for 45 minutes, then at room temperature for 4 hours. The water was removed by evaporation and the solid remaining was stirred in 125 ml of boiling acetonitrile. On cooling the filtrate, 2.8 grams of solid was obtained, m.p. 169°–174° C.

Calculated for $C_{14}H_{30}N_4$: C,66.15; H,11.81; N,22.04; Found: C,66.47; H,11.53; N,21.98.

EXAMPLE 5

Octadecahydroquinoxalino[2,3-b]quinoxaline

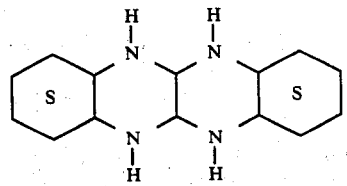

To an ice-cold solution of 11.4 grams (0.1 mole) of 1,2-diaminocyclohexane and 5 ml of water was added dropwise 8.3 grams of 40% aqueous glyoxal (2.9 grams, 0.05 mole). Within 5–10 minutes a precipitate formed, which was allowed to stand at room temperature for one hour, then heated at 65°–70° C. for 1.5 hours. The solid was recrystallized from acetonitrile to give 1.05 grams of tan crystals, m.p. 148°–155° C.

Calculated for $C_{14}H_{26}N_4$: C,67.20; H,10.40; N,22.40; Found: C,67.25; H,10.28; N,22.68.

EXAMPLE 6

4a,8a-Dimethyldecahydropyrazino[2,3-b]pyrazine

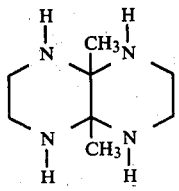

The compound was prepared in 37% yield by reacting ethylenediamine with biacetyl according to the method of Stetter, Chem. Ber. 86, 69 (1953).

EXAMPLE 7

To each of 100 parts by weight of a copolymer of 90 percent thiodiethanol-5 percent dithylene glycol-5 percent trimethylolpropane, monoallyl ether, 50 parts by weight of carbon black, and 1.5 parts by weight of sulfur, are added 3 parts by weight of:
A. decahydropyrazino[2,3-b]pyrazine
B. decahydro-2,6-dimethylpyrazino[2,3-b]pyrazine
C. decahydro-2,2,6,6-tetramethylpyrazino[2,3-b]pyrazine.

The resultant mixture was cured for 30 minutes at 330° F., and post-cured for 4 hours at 120° C. The compositions exhibited the following properties:

| Monsanto Oscillating Disc Rheometer @ 330° F. | | | |
|---|---|---|---|
| | A | B | C |
| Max. Cure Rate (in lbs./minute) | 3.0 | 3.4 | 3.2 |
| Instron Stress-Strain Properties | | | |
| | A | B | C |
| Tensile, psi | 1385 | 1460 | 1455 |
| Elongation, % | 205 | 210 | 215 |
| Hardness, Shore A | 69 | 68 | 68 |
| Compression Set, % (Method B: 22 hrs. @ 120° C) | 21 | 11.7 | 9.2 |

An identical composition which did not contain a decahydropyrazine compound was too slow curing and thus produced a badly undercured specimen which could not be evaluated.

EXAMPLE 8

100 Parts by weight of the elastomer of Example 7 was compounded as follows:

| | Parts by Weight |
|---|---|
| Elastomer | 100 |
| Carbon black | 50 |
| Calcium stearate | 5 |
| Calcium oxide | 1 |
| Sorbitan monolaurate | 1 |
| Sulfur | 1.5 |
| Mercaptobenzothiazole | 1.5 |
| Tetramethyl thiuram disulfide | 1.5 |

To separate portions of 161.5 parts of the above composition was added 4 parts by weight of (D) decahydropyrazino-[2,3-b]pyrazine, (E) decahydro-2,6-dimethylpyrazino[2,3-b]pyrazine and (F) decahydro-2,2,6,6-tetramethylpyrazino[2,3-b]pyrazine. The compositions were cured for 30 minutes at 330° F. and post-cured for 4 hours at 120° C. The compositions exhibited the following properties:

| | Control* | D | E | F |
|---|---|---|---|---|
| Monsanto Oscillating Disc Rheometer @ 330° F. | | | | |
| Max. Cure Rate (in. lbs./min.) | 0.3 | 3.2 | 3.3 | 2.9 |
| Torque after 15 min. (in. lbs.) | — | 70 | 70 | 65 |
| Monsanto Oscillating Disc Rheometer @ 400° F. | | | | |
| Max. Cure Rate (in. lbs./min.) | 3.2 | 9.4 | 9.4 | 9.1 |
| Torque after 5 min. (in. lbs.) | 22 | 64 | 66 | 64 |
| Max. Torque (in. lbs.) | 70–75 | 92 | 90 | 90 |
| Instron Stress-Strain Properties | | | | |
| Tensile, psi | under cured | 1505 | — | 1420 |
| Elongation, % | ↓ | 250 | — | 230 |
| Shore A Hardness | ↓ | 81 | — | 79 |
| Compression Set, % (Method B: 22 hrs. @ 120° C.) | ↓ | 25.4 | 15.1 | 16.1 |

*No pyrazine present

EXAMPLE 9

100 Parts of a copolymer of 90 percent thiodiethanol, 5 percent diethylene glycol and 5 percent trimethylolpropane, monoallyl ether, 50 parts of carbon black, 1.5 parts of sulfur, 5 parts of tetramethyl thiuram disulfide and 3 parts of decahydro-4a,8a-dimethylpyrazino[2,3-b]pyrazine (G) were mixed and cured for 30 minutes at 330° F. and post-cured for 4 hours at 120° C. The composition had the following properties:

|  | Control* | G |
|---|---|---|
| Monsanto Oscillating Disc Rheometer @ 330° F. | | |
| Max. Cure Rate (in. lbs./min.) | 1.1 | 3.3 |
| Instron Stress-Strain Properties | | |
| Tensile, psi | 1575 | 1650 |
| Elongation, % | 275 | 210 |
| Shore A Hardness | 64 | 74 |
| Compression Set, % (Method B: 22 hrs. @ 120° C.) | 84 | 17.7 |

*No pyrazine present

EXAMPLES 10–15

The procedure of Example 7 was again followed except the pyrazine used as (10) decahydro-2,7-diethylpyrazino[2,3-b]pyrazine, (11)decahydro-2,2,3,3,6,6,7,7-octa-n-butylpyrazino[2,3-b]pyrazine, (12) decahydro-2,2,6,6-tetraethylpyrazino[1,2-b]pyrazine, (13)4a,8a-diethyldecahydro-2,3,6,7-tetramethylpyrazino[2,3-b]pyrazine, (14)decahydro-2,6,di-n-hexylpyrazino[2,3-b]pyrazine, (15) 4a,8a-dimetyloctadecahydroquinoxalino[2,3-b]quinoxaline. In each instance, the curing agent provided cured elastomers hereof excellent compression set properties.

EXAMPLES 16

The procedure of Example 7 was again followed except that the elastomer was prepared from thiodiethanol (95 parts) and the monoallylether of trimethylolpropane (5 parts). Similar results were achieved.

EXAMPLE 17

The procedure of Example 8 was again followed except that the monoallyl ether of the elastomer was replaced by 3-cyclohexene-1,1-dimethanol. Similar results were achieved.

EXAMPLE 18

When the procedure of Example 9 was again followed except that the diethylene glycol was replaced by isopropylidene bisphenol, similar results were achieved.

We claim:

1. A vulcanizable elastomer composition comprising a mixture of (A) a vulcanizable elastomer of thiodiethanol, (B) sulfur, and (C) a pyrazine compound, represented by the formula (I):

(I)

$$\begin{array}{c} H \quad\quad H \\ | \quad\quad | \\ R_1\!-\!N \quad R_5 \quad N\!-\!R_1 \\ R_2\!-\!\phantom{X}\!-\!R_2 \\ R_3\!-\!\phantom{X}\!-\!R_3 \\ R_4\!-\!N \quad R_6 \quad N\!-\!R_4 \\ | \quad\quad | \\ H \quad\quad H \end{array}$$

wherein $R_1$ to $R_6$ are individually, hydrogen or $C_1$ to $C_6$ alkyl; or wherein the pair of radicals $R_2$ and $R_3$ together with the carbon atoms of the pyrazine ring represent a 6-membered alicyclic ring the remaining substituents being as defined; said valcanizable elastomer of thiodiethanol being a copolymer represented by the formula (II);

$$H\text{-}(OG)_n\text{OH} \qquad (II)$$

wherein —OG— comprises randomly alternating structural units selected from:

(A) structural units (III) and (IV)

$$\text{-}(OC_2H_4SC_2H_4)\text{-} \qquad (III)$$

$$\text{-}(OR)\text{-} \qquad (IV)$$

and (B) structural units (III), (IV), and (V)

$$\text{-}(OR')\text{-} \qquad (V)$$

wherein R is one or more radicals remaining on removal of two hydroxyl groups from:
  (a) saturated aliphatic linear, branched chain or cyclic diols, or
  (b) aliphatic linear, branched chain or cyclic diols containing external unsaturation having an allylic hydrogen atom;

wherein R' is one or more radicals which remain on removal of two hydroxyl groups from a diphenolic compound; said copolymers comprising structural units (A) and (B) being characterized in that:
  (1) n is an integer sufficient to provide in said copolymer an average molecular weight of at least 8000;
  (2) the molar ratio of (III) to (IV), when said copolymer comprises structural units (A), or the molar ratio of (III) to the total of (IV) and (V) when said copolymer comprises structural units (B), being not less than 1:1; and
  (3) containing from about 1 to 10 mole percent of said diol (b), based on the total of all units (III), (IV), and (V) present in said copolymer.

2. A vulcanizable elastomer composition in accordance with claim 1 wherein said copolymer of thiodiethanol comprises randomly alternating structural units (A).

3. A vulcanizable elastomer composition in accordance with claim 1 wherein said copolymer of thiodiethanol comprises randomly alternating structural units (B).

4. A vulcanizable elastomer composition in accordance with claim 1 wherein said pyrazine compound is decahydropyrazino[2,3-b]pyrazine.

5. A vulcanizable elastomer composition in accordance with claim 1 wherein said pyrazine compound is decahydro-2,6-dimethylpyrazino[2,3-b]pyrazine.

6. A vulcanizable elastomer composition in accordance with claim 1 wherein said pyrazine compound is decahydro-2,2,6,6-tetramethylpyrazino[2,3-b]pyrazine.

7. A vulcanizable elastomer composition in accordance with claim 1 wherein said pyrazine compound is 4a,8a-dimethyldecahydropyrazino[2,3-b]pyrazine.

* * * * *